United States Patent [19]

Peiperl

[11] Patent Number: 5,172,270
[45] Date of Patent: Dec. 15, 1992

[54] INVERTIBLE DISPLAY WITH A KALEIDOSCOPE

[76] Inventor: Adam Peiperl, 1135 Loxford Ter., Silver Spring, Md. 20901

[21] Appl. No.: 806,184

[22] Filed: Dec. 13, 1991

[51] Int. Cl.⁵ .............................................. G02B 23/00
[52] U.S. Cl. .................................................... 359/617
[58] Field of Search ................... 359/616, 617; 353/1, 353/2; 362/311

[56] References Cited

U.S. PATENT DOCUMENTS

| | | | |
|---|---|---|---|
| 2,423,371 | 7/1947 | Carranza | 359/616 |
| 2,954,723 | 10/1960 | Dunn | 353/1 |
| 3,674,333 | 7/1972 | Mandel | 359/616 |
| 3,748,013 | 7/1973 | Orans | 359/617 |
| 3,841,730 | 10/1974 | Karelitz | 359/617 |
| 3,990,772 | 11/1976 | Knott | 359/617 |
| 4,231,634 | 11/1980 | Gantz et al. | 359/617 |
| 4,653,843 | 3/1987 | Karelitz | 359/617 |
| 4,740,046 | 4/1988 | MacCarthy | 359/617 |
| 4,742,439 | 5/1988 | Choate | 362/311 |
| 5,029,954 | 7/1991 | Eilrich et al. | 359/617 |

FOREIGN PATENT DOCUMENTS

| | | | |
|---|---|---|---|
| 3822936 | 12/1989 | Fed. Rep. of Germany. | |
| 2290 | of 1873 | United Kingdom | 350/4.2 |
| 1331 | of 1875 | United Kingdom | 350/4.2 |

*Primary Examiner*—Richard A. Wintercorn
*Attorney, Agent, or Firm*—A. Fred Starobin

[57] ABSTRACT

A kaleidoscope utilizing birefringent material in the form of shaped pieces in a liquid with the pieces passing between sheets of polarizing material where the container holding the pieces and liquid is in the form of a tube or tubes, or is flat and elongated, or consists of circular plates held together by a ring, and the container can be inverted or rotated. The shaped pieces will have a higher or lower density than the liquid in which they are immersed, or may be a mixture of both densities and both rise and fall in the container.

15 Claims, 3 Drawing Sheets

INVERTIBLE DISPLAY WITH A KALEIDOSCOPE

FIELD OF THE INVENTION

The apparatus of the present invention is a kaleidoscope utilizing birefringent material in a liquid in a unit which can be inverted or rotated located between sheets of polarizing material.

BACKGROUND OF THE INVENTION

British Patent No 1331 issued in 1875 disclosed a kaleidoscope with a polarizing Nicol prism or a tourmaline plate and objects of thin selenite plates of various shapes, subjected to the polarized light, with the cell containing the selenite possibly being rotatable with respect to the body of the apparatus.

German Patent No. DE 3822936 (1989) discloses a kaleidoscope with polarizing filters on opposite sides of a chamber for birefringent material.

U.S. Pat. No. 3,841,730 of Karelitz discloses a kaleidoscope with objects of birefringent material between polarizing discs which may or may not be rotatable relative to each other.

U.S. Pat. No. 5,029,954 of Eilrich et al discloses a kaleidoscope having a removable tube inserted through the barrel of the kaleidoscope and containing a liquid and contrasting discrete-colored (one color per piece) particles therein.

Other U.S. Pat. Nos. 2,423,371 of Carranza; No. 3,674,333 of Mandel; and No. 4,653,843 of Karelitz also disclose birefringent material between sheets of polarizing material.

SUMMARY OF THE INVENTION

It is an object of the present invention to present a view through a kaleidoscope which is further enhanced by a flow of birefringent pieces passing through the viewing plane of the instrument.

It is a further object of the present invention to increase the amount of time of this flow of birefringent pieces for each rotation of the portion of the instrument holding the birefringent pieces.

It is a still further object of the present invention to have the birefringent pieces simultaneously appear to generate from the center and fall into the center, either in separate tubes or in the same tube.

The above stated objects may be accomplished by use of the apparatus of the present invention, wherein an elongated tube or tubes are mounted near one end of a kaleidoscope away from the eyepiece at the end of the kaleidoscope housing, or on a turntable at the end of the kaleidoscope mirrors away from the side containing the eyepiece through which the sighting into the housing takes place, with pieces of birefringent material free to move in a liquid through the housing containing the kaleidoscope mirrors and polarizing sheets, with the polarizing sheets on opposite sides of the elongated tube where it passes through the housing, perpendicular to the housing and with birefringent pieces of varying density relative to the liquid in the tube or tubes.

Tubes or object cases may have a flat, elongated shape alternatively to round, elongated tubes or in another embodiment may have a circular shape of two transparent plates connected together along their periphery by a ring.

BRIEF DESCRIPTION OF THE DRAWINGS

These and other objects and advantages of the present invention will become apparent to those skilled in the art upon reading the details of construction and use as more fully set forth below, reference being made to the accompanying drawings forming a part hereof.

DETAILED DESCRIPTION OF THE PREFERRED EMBODIMENTS

Figure 1:
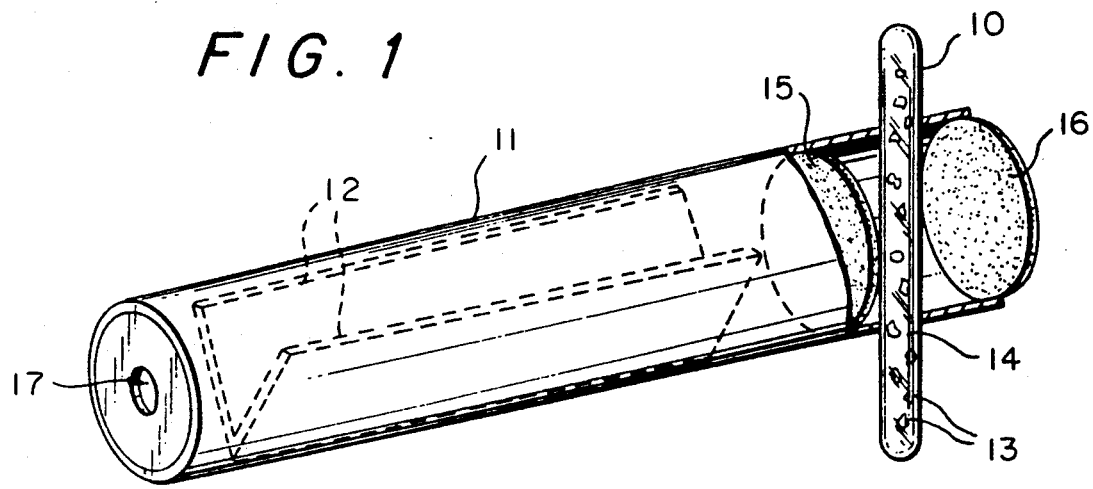
FIG. 1 is a partially sectioned perspective side view of an embodiment of the present invention showing a kaleidoscope with a tube passing through its housing near one end between polarizers.

As shown in FIG. 1, a transparent tube 10 of plastic material or glass passes through a kaleidoscope housing 11 in a direction perpendicular to the housing 11 and to the V of angularly positioned mirrors 12. Pieces of birefringent material 13 such as clear, biaxially oriented polystyrene have been added to a liquid 14 within the tube which has then been sealed. An air expansion bubble is left in the tube to provide for expansion of the liquid 14 in case the temperature of the tube is raised.

The pieces of birefringent material 13 may be of a heavier or lower density than liquid 14. Pieces 13 will fall to the bottom of the tube if such pieces are of a density of plastic such as polystyrene and the liquid 14 is water. If the density of the pieces 13 is less than that of the liquid 14, for example, as with polypropylene in water, then the pieces 13 will rise in tube 10 instead of falling. Also, the falling of the pieces 13 in tube 10 may be slowed down by increasing the viscosity of the liquid by adding glycerin to water, e.g. 5% by volume. In addition, pieces 13 may be a mixture of high and low density pieces so that some will rise and the others fall in the liquid of the tube. In the kaleidoscope, this appears as if some shaped pieces are generated by the center, while others fall into the center.

Located on each side of the portion of tube 10 passing through the housing 11 are polarizing filters 15 and 16. Filter 15 is located on the side of the tube 10 nearest to the eyepiece 17, and filter 16 is located on the outward side of the housing 11 at the end farthest from eyepiece 17, with the filters having their polarization axes perpendicular, or nearly so, to each other.

While the birefringent pieces 13 fall or rise, they generate intense rainbow-like colors as they pass between polarizing filters 15, 16, and are viewed with the kaleidoscope mirrors 12.

Inverting tube 10 such as by rotating kaleidoscope housing 11 causes the shapes which have accumulated at one end of tube 10 to fall (or rise) and pass in front of the kaleidoscope mirrors 12. The motion of the birefringent pieces 13 generates a burst of spectral colors for the viewer observing through eyepiece 17. This is in contrast to what is seen when colored particles are used as in some prior art devices where the colors appear by reflection and thus each particle reflects only its own color. In the present invention each moving particle of birefringent material 13 goes through a range of spectral colors by transmission of light in the time that it travels in front of the mirrors 12, creating a veritable fountain of rainbows.

Figure 1A:
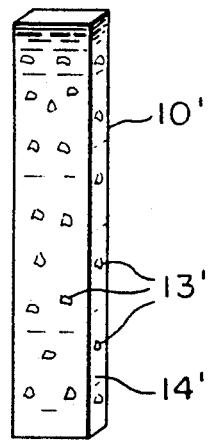
FIG. 1A is a perspective view for a different shaped object case for containing the birefringent pieces.

FIG. 1A shows a tube or object case 10' of a flat elongated shape which may be substituted for the rounded tube 10 discussed above. Similarly birefringent pieces 13' may fall or rise in liquid 14'.

Figure 2:
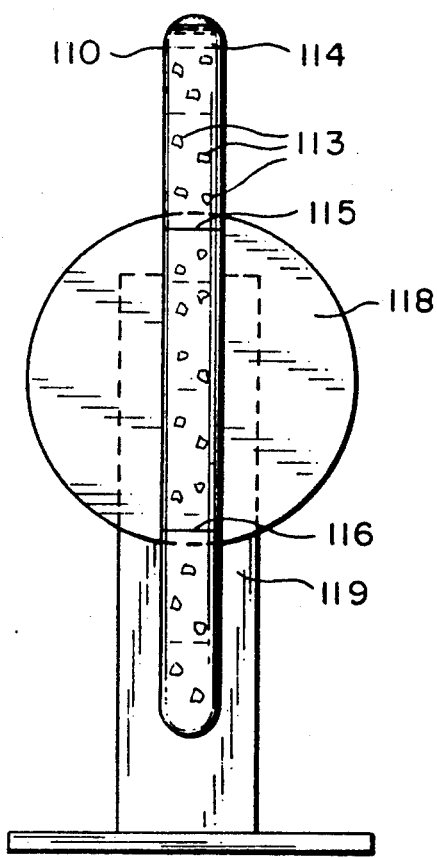
FIG. 2 is a front view of a tabletop model of the tube of the present invention mounted for rotation.
Figure 3:
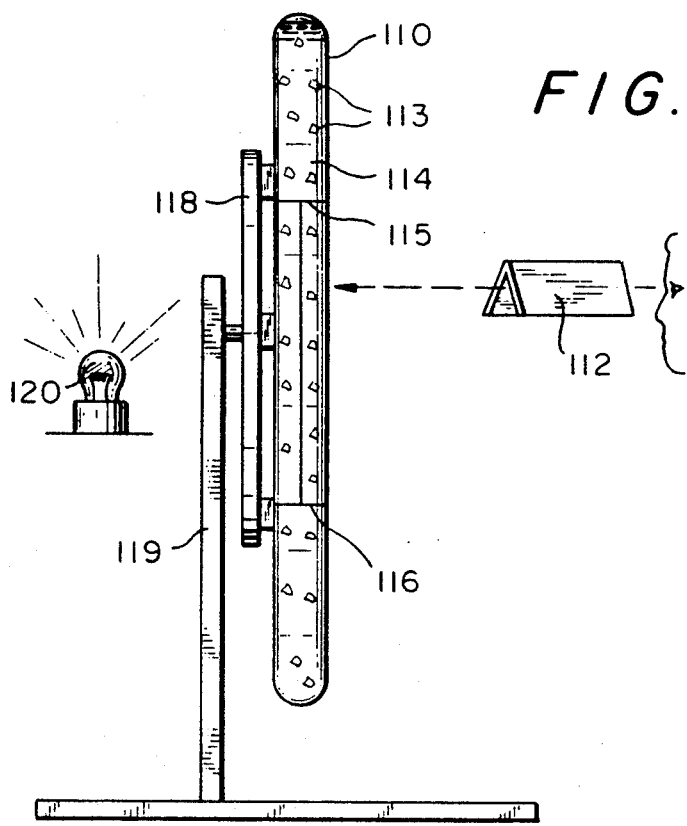
FIG. 3 is a side view of the tabletop model of FIG. 2 as used with kaleidoscope mirrors.

FIGS. 2 and 3 utilize the same principles described above but without the housing 11. Instead, a transparent tube 110 filled with a colorless liquid, or a colored liquid as long as it is a transparent liquid, uses pieces 113 of birefringent material in the sealed tube, with the same choice of densities of pieces 113 and liquid 114 as discussed previously in relation to FIG. 1.

In this case the polarizing sheets 115, 116 are wrapped around the front and rear respectively of tube 110. Alternatively, the entire tube 110, or a portion thereof, can be wrapped in a sheet of polarizing material which has been cut in such a way that its polarization axis in the front of tube 110 is perpendicular to the polarization axis in the rear no matter from which side the tube is viewed.

Tube 110 wrapped in polarizing sheets 115, 116, is mounted on a vertical supporting disc 118 which is mounted on a back plate support 119 attached in an upright position to a stand base. Since a light source 120 is located behind back plate support 119, for best effect, both back plate support 119 and vertical supporting disc 118 may be of a transparent or translucent material. Alternatively, disc 118 may be of such a small size as not to be in the direct path of the light passing through the tube or tubes.

As shown in FIG. 3, for the kaleidoscope effect the tube is viewed through V or angularly positioned mirrors 112, which may be mounted in a kaleidoscope housing or held separately as a teleidoscope by the observer.

When a teleidoscope (which by definition has no built-in object chamber, just mirrors) is used, the front polarizing sheet can be attached to the front or rear of the teleidoscope in an alternative embodiment. Also, two mirrors in an isosceles triangle configuration, or three mirrors in an equilateral triangle configuration can be used.

Again, as described previously, the birefringent pieces 113 move downward or upward depending on the relative densities of the pieces 113 and the liquid 114 in the tube 110 upon the starting of the rotation of vertical supporting disc 118 and inverting of tube 110. Because the tube is mounted on a vertical turntable, rotating the tube rapidly through 180 degrees a few times causes the floating shapes of pieces 113 to swirl or turn quickly, thus producing the visual effect of a very energetic motion in the kaleidoscope.

Figure 4:
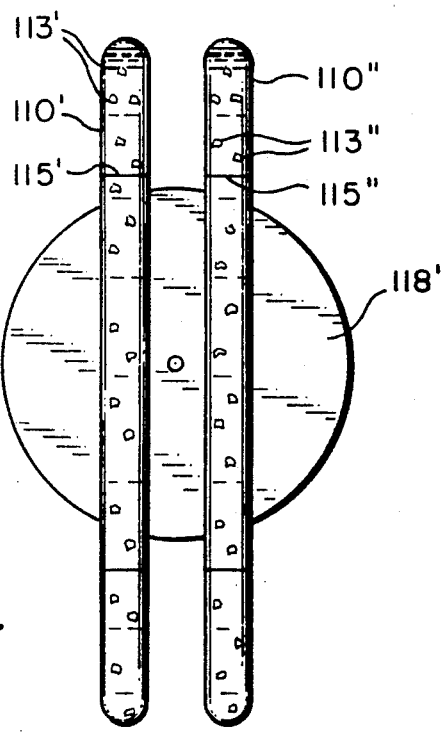
FIG. 4 is a front view of the embodiment of FIG. 2 but with two tubes on the turntable.

As shown in FIG. 4, two tubes 110' and 110" can be mounted side by side on turntable 118', one tube 110' containing shaped pieces 113' of density lower than the density of water, and the other tube 110" containing shaped pieces 113" of density higher than that of water, so that the shaped pieces 113' rise in tube 110' while shaped pieces 113" fall in tube 110".

Figure 5:
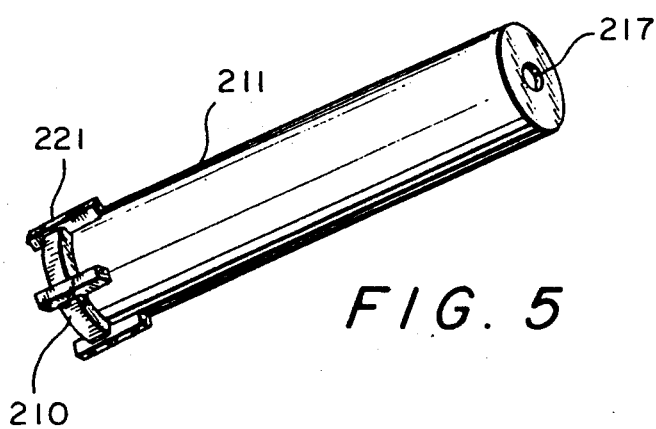
FIG. 5 is another embodiment of a kaleidoscope with a rotatable object case attached thereto.
Figure 6:
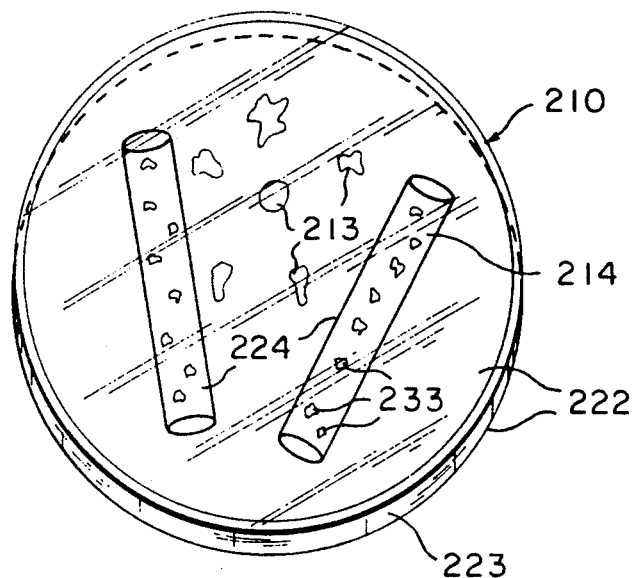
FIG. 6 is a plan perspective view of a type of object case used in FIG. 5.
Figure 7:
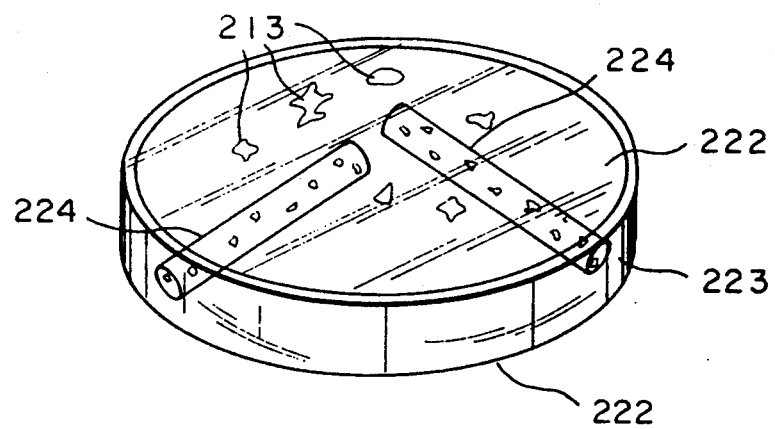
FIG. 7 is a side perspective view of a type of object case as shown in FIGS. 5 and 6.

FIGS. 5, 6 and 7 illustrate another embodiment of the present invention wherein an object case 210, instead of the previously discussed tube, is attachable by prongs 221 to kaleidoscope housing 211 and rotatable either on the housing 211 or by rotation of the whole housing 211. Object case 210 as shown in detail in FIGS. 6 and 7, is a sealed glass or plastic tube in the shape of flat circular sides 222 attached by ring 223 and containing birefringent pieces 213, some loose and others contained in sealed transparent tubes 224 filled with a liquid 214. As before, the birefringent pieces drop, or rise, in the sealed tubes upon each inversion of the case 210. The circular sides 222 may include crossed polarizers as the sides of the object case and each detachable object case may be used as part of a kaleidoscope or a teleidoscope.

It will be obvious to those skilled in the art that various changes may be made without departing from the scope of the invention and the invention is not to be considered limited to what is shown in the drawings and described in the specification.

I claim:

1. A kaleidoscope device comprising
   a support plate through which light may pass;
   a light source behind said support plate;
   a rotatable disc through which light may pass mounted for rotation on said support plate;
   at least one transparent container attached to said rotatable disc for rotation with said disc;
   a liquid and birefringent pieces floatable in said liquid in said at least one container having different densities of said liquid and said birefringent pieces;
   a polarizing sheet in front and in back of said at least one container with different angles of axes of polarization in front and in back;
   mirrors in a V configuration positioned for viewing of said at least one transparent container and said shaped pieces therein in the area having said polarizing sheets;
   said polarizing sheet being a single sheet wrapped around said container so that the front and back polarization axes are at an angle to each other.

2. An object case comprising
   a container;
   shaped birefringent pieces in a liquid in said container;
   a polarizing sheet wrapped around said container in the front and rear of said container so that the polarization axes of said sheet in the front and rear are at an angle to each other.

3. A kaleidoscope device comprising
   a support;
   a container rotatably mounted on said support;
   mirrors in a V configuration positioned for viewing of said container;
   means extending from said support and engaging with said container to hold said container to said support and allow said container to be rotated relative to said support;
   polarizing material positioned in front and in back of said container;
   transparent tubes in said container having liquid and shaped birefringent pieces in said tubes.

4. The kaleidoscope device of claim 3 wherein
   a liquid is in said container in addition to said liquid in said tubes;
   additional birefringent pieces are in said liquid in said container outside of said tubes.

5. The kaleidoscope device of claim 4 wherein said birefringent pieces in said container and said birefringent pieces in said tubes are of a varied density, some of lesser density than the liquid in which they are immersed and some of greater density than the liquid in which they are immersed.

6. The kaleidoscope device of claim 3 wherein
at least two containers are mounted for rotation on said support.

7. The kaleidoscope device of claim 4 wherein
said container is in the shape of a tube.

8. The kaleidoscope device of claim 4 wherein
said container is of a flat and elongated shape.

9. The kaleidoscope device of claim 3 wherein
said means extending from said support and engaging with said container including
 a support plate through which light may pass mounted on said support;
 a light source behind said support plate;
 and a rotatable disc through which light may pass mounted for rotation on said support plate;
at least one said container attached to said rotatable disc for rotation with said disc.

10. The kaleidoscope device of claim 3 wherein
at least one of said transparent tubes is of birefringent material.

11. An object case comprising
a container;
shaped birefringent pieces in a liquid in said container;
polarizing filters in the front and rear of said container with their polarization axes at an angle to each other;
a transparent tube in said container containing said shaped birefringent pieces in said liquid.

12. The object case of claim 11 wherein
at least one additional transparent tube containing liquid and shaped birefringent pieces is in said container;
and additional birefringent shaped pieces are in said container outside of said tubes.

13. The object case of claim 11 wherein
said container is in the shape of a tube;
means are attached to said tube to invert said tube in a vertical plane;
in said container, some of said shaped birefringent pieces have a density less than the density of said liquid, and the others of said shaped birefringent pieces in said container have a density greater than the density of said liquid.

14. The object case of claim 12 wherein
liquid is also in said container outside of said transparent tubes and said aforementioned liquid contains said additional birefringent shaped pieces.

15. The object case of claim 11 wherein
said polarizing filters are in the form of a polarizing sheet wrapped around said container so that the front and back polarization axes are at an angle to each other.

* * * * *